(12) United States Patent
Bruzzo

(10) Patent No.: US 6,658,880 B1
(45) Date of Patent: Dec. 9, 2003

(54) METHOD AND DEVICE FOR DEPOLLUTING COMBUSTION GASES

(75) Inventor: Vitale Bruzzo, Vicenza (IT)

(73) Assignee: S.F.T. Services SA, Sion (CH)

( * ) Notice: Subject to any disclaimer, the term of this patent is extended or adjusted under 35 U.S.C. 154(b) by 0 days.

(21) Appl. No.: 10/070,291

(22) PCT Filed: Sep. 4, 2000

(86) PCT No.: PCT/IB00/01245

§ 371 (c)(1),
(2), (4) Date: Apr. 30, 2002

(87) PCT Pub. No.: WO01/18366

PCT Pub. Date: Mar. 15, 2001

(30) Foreign Application Priority Data

Feb. 4, 2000 (CH) .............................................. 223/00
Feb. 28, 2000 (CH) .............................................. 379/00

(51) Int. Cl.$^7$ .............................. F25B 27/00; F02G 5/00
(52) U.S. Cl. .......................... 62/238.3; 62/239; 62/476; 123/542
(58) Field of Search ................................ 62/238.3, 476, 62/239, 243, 323.1, 323.2, 101, 112; 123/542, 540

(56) References Cited

U.S. PATENT DOCUMENTS 3,748,830 A  * 7/1973 Ross et al. ..................... 95/195
4,272,958 A  * 6/1981 Waltrip ........................ 60/309
5,383,341 A    1/1995 Zur et al.
6,182,643 B1 * 2/2001 Canopy ....................... 123/542

FOREIGN PATENT DOCUMENTS

DE       3007962 A    9/1981
GB       1357034 A    6/1974

* cited by examiner

Primary Examiner—Chen Wen Jiang
(74) Attorney, Agent, or Firm—Clifford W. Browning; Woodward, Emhardt, Moriarty, McNett & Henry LLP

(57) ABSTRACT

The invention concerns a device for depolluting combustion gases set along the exhaust line of the gases. The device has a gas cooling chamber (9, 10) lowering the gas temperature to near 0 degrees Celsius. In one particular embodiment of the invention, the energy of the exhaust gases of an internal combustion engine is used for providing the cold required for the depollution process.

11 Claims, 3 Drawing Sheets

METHOD AND DEVICE FOR DEPOLLUTING COMBUSTION GASES

The present invention concerns a procedure and a device for processing combustion gases, and more particularly a procedure and a device for the depollution of combustion gas.

BACKGROUND OF THE INVENTION

During the combustion of fuels such as gasoline or gas-oil a great number of components are produced such as nitrogen oxide ($NO_x$), carbon monoxide (CO), and the hydrocarbons (HC). To this is added the ozone ($O_3$), a secondary pollutant formed by photochemical reactions between the nitrogen oxide and the hydrocarbons.

Public institutions have encouraged research in order to reduce these harmful emissions and many devices have been proposed. We know, in the automobile field, the use of the catalyst, whose action is to burn the harmful substances.

Unfortunately the catalyst only reduces certain emissions, and on the contrary transforms certain components in even more dangerous substances.

Other solutions have been presented particularly in the industrial field with the use of water filters in the chimney conducts to capture and recover toxic substances in the water. This water is re-processed in order to separate it from these substances and then re-injected in the filter circuit.

Although a certain improvement of the quality of the air has been registered thanks to the use of these depollution devices, the latter present gaps, either in their installation or in their cost or efficiency.

SUMMARY OF THE INVENTION

The objective of the present invention is to propose a procedure and a device that eliminates 100% of the most toxic substances, at the same time not generating any other harmful substance.

This objective is totally achieved by the depollution device of combustion gases of the present invention, characterised in that this device comprises a cooling chamber of the gases at a low temperature.

According to the invention, the procedure consists in depolluting the combustion gases by cooling them at a low temperature.

The depollution effect is obtained by the condensation of the polluting substances in a chamber where the gases are cooled at a temperature of a few degrees above zero. The condensation effect is produced when the gases are cooled, understanding that the lower the temperature the more the effect is increased.

The optimal temperature of condensation is near zero degrees Celsius, preferably between 3 and 6° C., that is, just before ice crystals are formed. In fact, the formation of ice would have as a consequence the rapid obstruction of the exhaust.

The condensation liquid is then recovered for its ecological elimination.

This type of device can be used in a great number of installations, for example on the incineration factory chimneys, as well as for other applications of industrial chimneys, even in the field of vehicles with internal combustion engines.

In this last field, the present invention extends also to a cold production device (for example air conditioning) by recovering the thermal energy of the exhaust gases of the vehicle.

Such devices are described in the state of the art, particularly in the document GB-A-1357034 which describes a depollution device of the combustion gases according to the preamble of claim 1.

Although the main objective of this invention is the depollution of combustion gases, the invention is also understood as a system performing for the production of cooling energy by recovering the thermal energy of the combustion gases.

In order the cool the exhaust gases an evaporator is used placed in the exhaust box, which substantially cools said gases. Recuperators placed along the evaporator collect the condensation liquid. This liquid can either be ecologically eliminated at a rythm equivalent to the emptying of the engine oil or be reinjected in the receiver. In fact, due to its low quantity of production its mixing with gasoline or gas-oil causes no problem.

In a particular embodiment of the invention, the mixture coolant/absorbent used for the thermal cycle is a mixture of water (the absorbent) and ammonia (the coolant). The latter presents a good expansion property, an essential characteristic in this type of use. Trials have shown that with more than 70% of water in the mixture the cycle does not function any more in an optimal way.

BRIEF DESCRIPTION OF THE DRAWINGS

The invention will be better understood with the help of the following detailed description referring to the annexed figures which are given as a non-limiting example, in which.

DETAILED DESCRIPTION OF THE PREFERRED EMBODIMENT

TABLE

| Name of the substance | Quantity before the filter(% of volume) | Quantity after the filter (% of volume) |
|---|---|---|
| Toluene | 0.28 | 0 |
| 2,4-Dimethylheptene | — | — |
| Octanal | 0.1 | 0 |
| n-Nonane | 0.17 | 0 |
| N-Decane | — | — |
| 4-Methyldecane | 0.32 | 0 |
| Propylcyclopentane | 0.16 | 0 |
| Undecane | — | — |
| Dodecane | — | — |
| 1-Chlorohexadecane | 0.01 | 0 |
| 1-Chloro-octadecane | 0.01 | 0 |
| n-Tridecane | 0.08 | 0 |
| 1,2,3,4-Tetrahydro-5-n-Tetradecane | — | — |
| 2,7-Dimethylnaphtalene | — | — |
| Cyclotetradecane | 0.1 | 0 |
| 2,6,11-Trimethyldodecane | 0.2 | 0 |
| 3,8-Dimethyldecane | 0.1 | 0 |
| n-Pentadecane | 0.42 | 0 |
| n-Hexadecane | — | — |
| n-Eicosane | — | — |
| n-Heptadecane | — | — |
| n-Octadecane | — | — |

On the Table we have represented the analysis results of a sample of a tractor's exhaust gas emission on which has been assembled the system according to the invention. We can see that all the components of low molecular weight have been eliminated 100%. In a general way the pollutants of low molecular weight such as toluene, the aldehyde as well as certain hydrocarbons of low weight (for example chloroparaffin) disapper completely. Only the molecules of important weight remain that escape condensation. We will particulary note the total elimination of toluene, a substance known as dangerous. Globally, with the lowering of the temperature of the gases to 69° C. we eliminate 75% of the pollutants.

Figure 1:
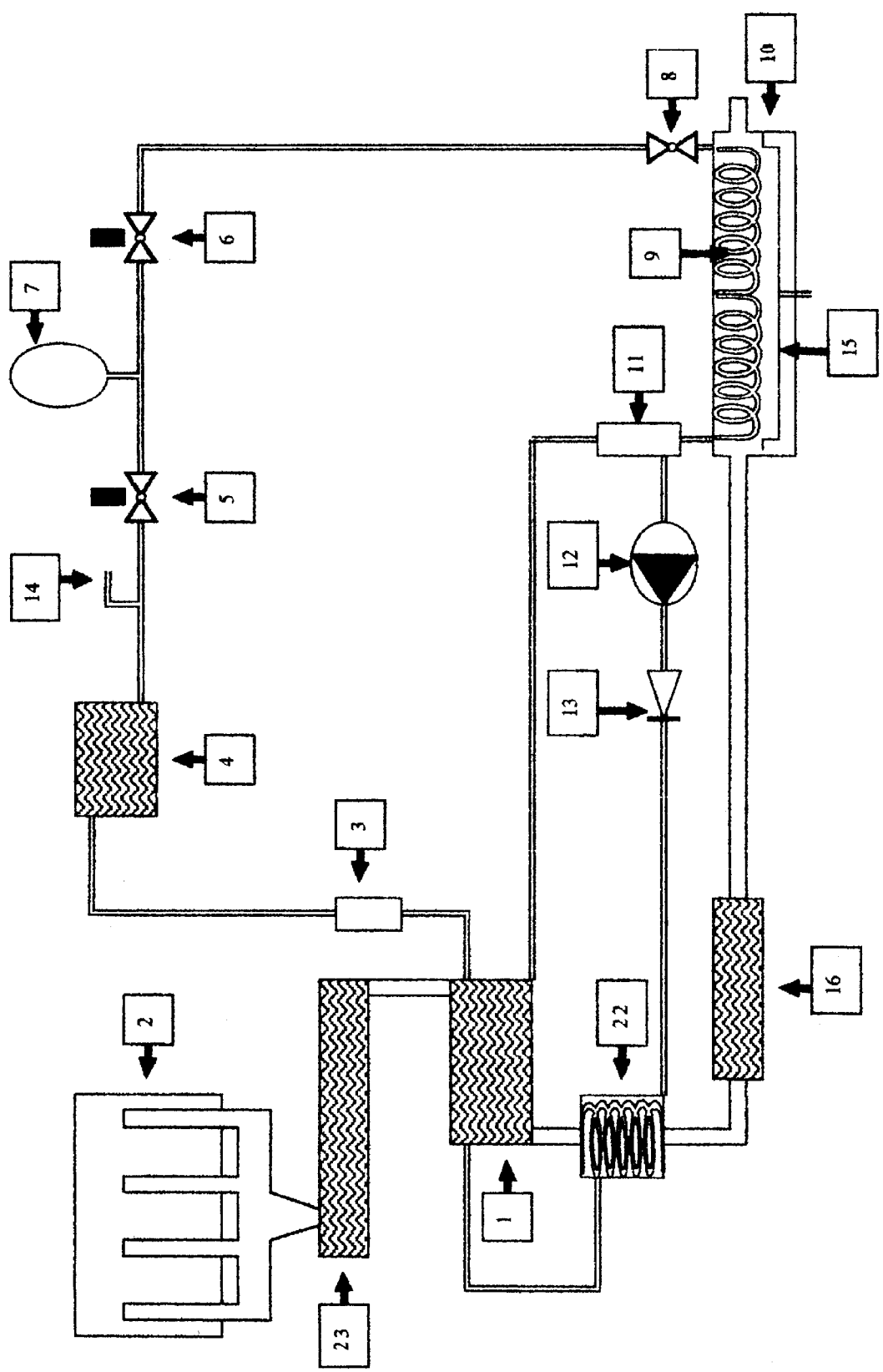
FIG. 1 represents the depollution system of the gases using as an energy source the combustion gas of a piston engine.

FIG. 1 represents a complete system of use of the invention on a vehicle, with a first use for the depollution and a secondary one as cold production for the vehicle. The mixture water-ammonia passes through a boiler 1 fed with heat by the exhaust gases coming out of the engine 2. The boiling point of ammonia is very low (about −33° C.) and under the effect of the gases heat it evaporates abandoning the water in which it was mixed. Due to the fact that a part of the water also evaporates we place a liquid separator 3 whose mission is to retain the water vapours and to only let pass the ammonia vapours. These vapours then pass through a condenser 4 that transforms the vapours in liquid form by means of the pressure produced by the system. The water, heavier than ammonia, is collected in the lower part of the boiler 1 and is conducted to the absorber 11 for its re-combination with the ammonia finishing its transfer cycle.

One of the particularities of this assembly is constituted by the electrovalves 5 and 6 and the receiver 7. The first electrovalve 5 opens when the pressure on the receiver side is lower than on the condenser side 4. The second electrovalve 6 is commanded by the engine feeding contact. When it stops, the electrovalve 6 is closed and the electrovalve 5 is closed when the pressure produced by the evaporation of the ammonia disappears, that is, when the gases stop heating the boiler 1. In this case the receiver 7 maintains the functioning pressure in liquid form under pressure, the two electrovalves being closed.

When starting the engine the electrovalve 6 opens and the accumulated pressure in the receiver 7 immediately produces cold in the exhaust evaporator. This configuration is distinguished from the catalyst box system that does not function immediately, the latter needing a heating time of several minutes.

Upstream of the final exhaust box we find a first stage of cooling 16 that allows to lower the temperature of the gases to about 50° C.

Near the exhuast box 10, we find the expansion valve 8 regulated by a temperature sensor (not represented). The ammonia is evaporated in the evaporator 9 and its expansion produces a lowering of the temperature being able to reach −25° C. The expansion valve 8 is regulated to cool the gases of the exhaust box 10 to about 4° C.

Inside the box 10, under the evaporator 9 is the recuperator of condensation liquid 15. A channel allows to pump this liquid and to reinject it in the fuel deposit.

The pressure of the ammonia, initially at about 15 bars at the exit of the boiler, ends up at about 1 or 2 bars in the evaporator 9. Once the cycle is finished the ammonia is sent inside the absorber 11 to be absorbed by the water and then pushed by a pump 12 inside the boiler 1. An anti-return valve 13 prevents the mixing from reflowing inside the pump when the engine stops.

In one embodiment a part of the ammonia under pressure is derived in a second circuit 14 for the production of cold in order to refrigerate the passenger compartment or a cooling chamber of the vehicle. It should be noted that the production of cold in this way not only hardly consumes any energy and thus does not affect the performance of the vehicle (which is far from being the case of the current systems) but has as an advantage of depolluting the vehicle's gases.

Figure 2:
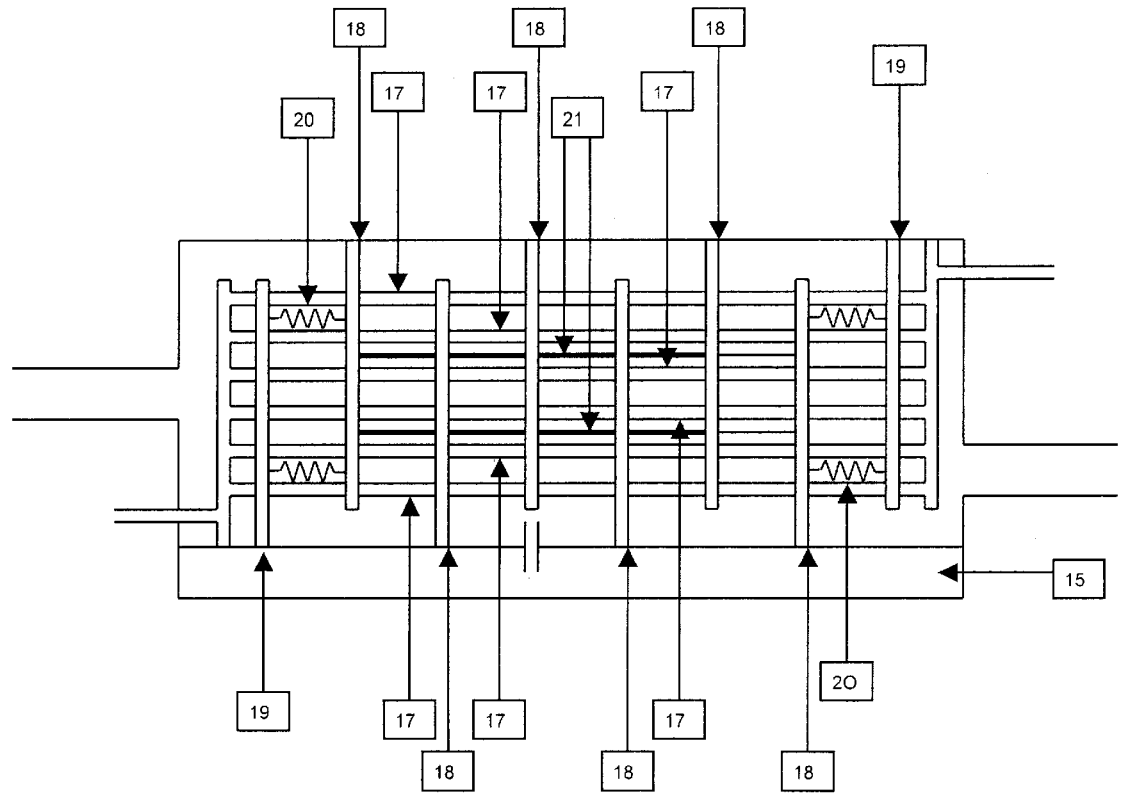
FIG. 2 represents an automatic cleaning device of the evaporator.

FIG. 2 inidcates an elegant way of avoiding the forming of deposit along the coil 17 placed in the exhaust box 10. It is known that the exhaust gases have a tendency to block the different interior objects, and the coil 17 especially. This would produce a rapid degradation of the performance of the installation. To avoid this blocking a new solution is proposed that consists in assembling the coil 17 between two fixed plaques 19 at each end and a plurality of moveable plaques 18 between these two plaques, the latter presenting orifices adjusted to the diameter of the coil. The fixed plaques 19 comprise a great number of orifices to let pass freely the gases. The moveable plaques 18 are supported between them by spacers 21, and the assembly formed by these plaques is supported in standby position by springs with a small twisting moment 20, linked to the fixed plaques 19. In this way, when the exhaust gases enter the box they push the moveable plaques 18 that rub the coil in its length eliminating the residues that are fixed there. When the engine speed lowers brusquely an inverse pressure is induced in the exhast box and the moveable plaques 18 are pulled towards the entry of the box. This movement of to and fro allows to ensure an automatic cleaning of the coil.

It is clear that the moveable plaques 18 do not close completely the diameter of the box but they are partially open, one on the lower part, the following on its higher part and so on. This disposition forces the gases to do a zigzag before ending their path at the exit of the box, and ensures a pressure against the moveable plaques. This configuration also forces the gases to pass through a water receiver that is formed by condensation of the water vapour contained in the gases. This path through the liquid allows to capture the particles contained in the gases.

These particles are deposited in the bottom of the exhaust box and when the level is sufficient they enter the recuperator 15. According to one of the embodiments of the invention the recuperator is emptied about every 80,000 km.

Figure 3:
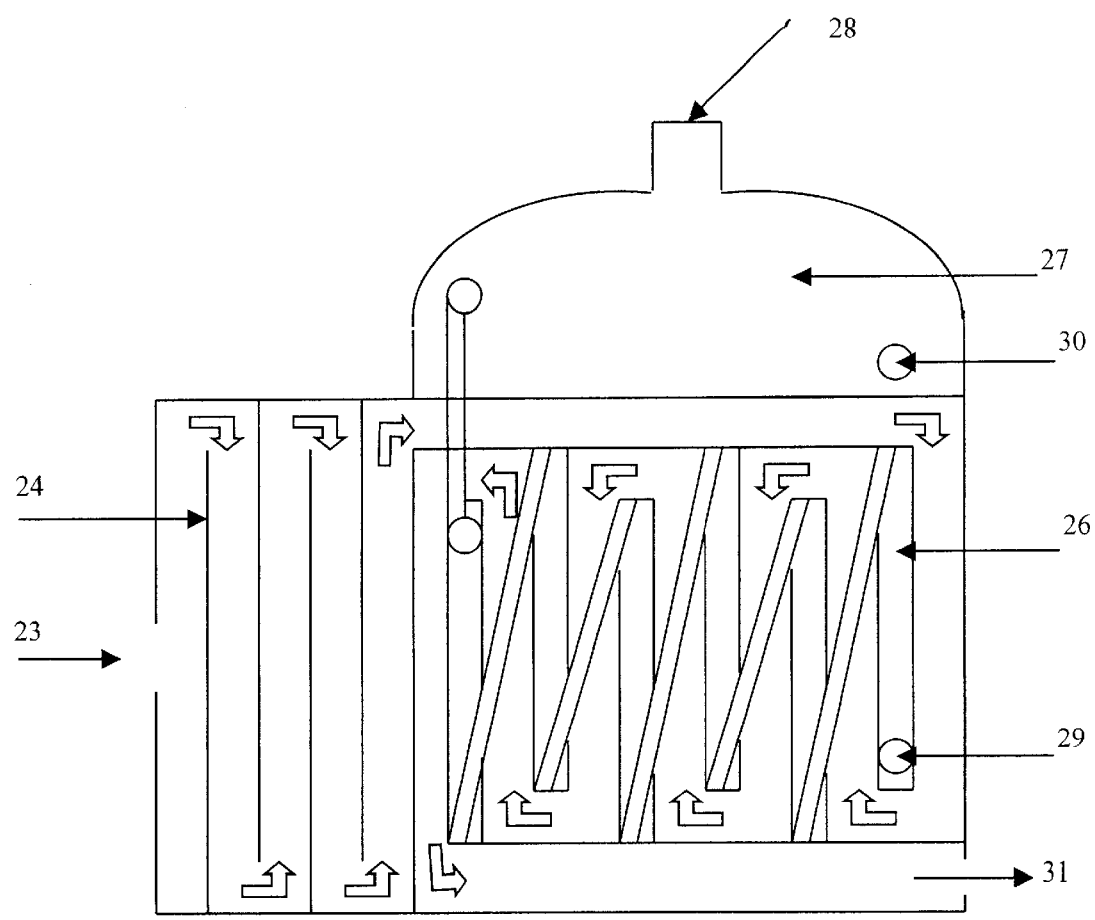
FIG. 3 represents the integration of a catalyst-boiler element

In FIG. 3 a compact embodiment of a catalyst-boiler assembly is illustrated. The role of the catalyst-boiler is:
  to burn the residues of the fumes (CO—Nox—HC) by means of a catalytic procedure,
  to re-heat the rich solution example $NH_3H_2O$ in order to separate the $NH_3$ from the $H_2O$ through a mixed-matix cooler (3) and a boiling chamber (4).

The fumes are admitted through one or several entries 24 (depending on if we choose to put the boiler in the place of the collector or after the collector) in the catalytic chamber, the latter being supplied with plaques 25 whose material and number can vary according to the vehicles (from gold plated to platinum plated, passing through certain stainless steels, etc.).

Example: the gold melting at 1064° C. will be more adequate for the gas-oil. For the gasoline engines it will be more adequate to use platinum, that melts at 1755° C.

After the catalytic chamber the fumes pass through a mixed-matrix cooler 26 in which they re-heat a liquid, for example $NH_3$—$H_2O$ taking it to the temperature sufficient for separating the $NH_3$ from the $H_2O$. In this apparatus then we free the fumes of a great part of the Nox—CO and HC and a liquid re-heats them (rich solution 29) to obtain thanks to a separation a cooling fluid.

Let us take the example of the liquid $NH_3$—$H_2O$. At 20° C. one litre of $H_2O$ can absorb about 520 g or 0.8 litres of $NH_3$ increasing the temperature of the $NH_3$. The latter boiling at −33° C. is separated from the $H_2O$ and thus creating a pressure that even if the temperature exceeds 100° C. (and could reach 150° C.) the $NH_3$ will be vapour and the $H_2O$ will remain liquid (law of Mollier). This action allows thus to separate the $NH_3$ from the $H_2O$ only conveying the $NH_3$ in its coolant form 28 and the $H_2O$ that we will call poor solution 30 in its absorbent form for a new cycle.

As for the fumes, separated from a great part of Nox—CO and HC and, partially cooled, they go 31 towards other decantation devices.

For small engines, and particularly when they run at idling speed, the production of cold can be insufficient. This particularly is the case when the cold is also used for other objectives such as the cooling of the vehicle's passenger compartment.

We find this same problem when we have a small autonomous engine in charge of generating the electric energy as well as the cold for the cooling chamber.

To improve the production of cold, that is, to improve the performance of use of the heat produced by the engine for the production of cold it is proposed to add at the exit of the boiler 1 a first mixed-matrix cooler of heat 22 in charge of pre-heating the mixture water-ammonia before sending it into the boiler. This mixed-matrix cooler 22 accelerates the heating of the mixture and pre-cools efficiently the exhaust gases.

The gases at the exit of the boiler are at a temperature of about 140° C. and are lowered to a temperature of about 60° C. at the exit of the mixed-matrix cooler 22. Thanks to this configuration the presence of the stage of cooling 16 is no longer necessary, the gases being cooled enough by the mixed-matrix cooler 22. The global performance of the heat produced by the engine for the production of energy cold exceeds 50%.

The measures carried out on the pollutant residues that remain after the cooling system of the gases show that 75% of the emissions are condensed. In fact, the cooling system eliminates nearly the totality of hydrocarbons and the totality of paricles but lets pass the carbon monoxide (CO), the nitrogen oxide ($NO_x$), as well as the hydrocarbons (HC) at a low boiling temperature.

The catalyst burns all this but lets pass the particles and creates others (platinum, palladium, rhodium, etc.) clearly more harmful than lead.

To improve this result it is proposed to combine the catalyst generally used on motor vehicles and the cooling system described above.

To do this, a catalyst 23 duely isolated is placed just at the exit of the engine 2 before the boiler 1. Thanks to the combination of these two techniques we achieve the elimination of all the particles whichever they be, the results show an elimination of 99% of the pollutant emissions.

What is claimed is:

1. A depollution device of the combustion gases placed along the exhaust circuit of said gases, assembled on a motor vehicle, comprising a boiler (1) in which the thermal energy supplied by the exhaust gases produces the evaporation of a mixture coolant-absorbent, a liquid separator (3) situated at the exit of the top part of the boiler (1), an evaporator (9) allowing the cooling of the exhaust gases followed by an absorber (11) for the recombination of the mixture coolant-absorbent, characterised in that it comprises a catalyst (23) placed at the exit of the engine's gases and before the boiler (1), an expansion valve (8) placed upstream of the evaporator (9) the latter being assembled on an exhaust box (10) and upstream of the absorber (11) situated at the exit of the boiler (1), a pump (12) downstream of the absorber (11) to send the mixture coolant-absorbent into the boiler (1) and a condenser (4) placed between the liquid separator (3) and the expansion valve (8) that transforms in liquid form and thanks to the pressure produced by the system the vapours filtered by the liquid separator (3), the latter being destined to only let pass the vapours of the coolant.

2. A device according to claim 1, characterised in that the expansion valve (8) is regulated to cool the gases between 3 and 6 degrees Celsius.

3. A device according to claim 1, characterised in that the catalyst (23) and the boiler (1) are made in one single piece.

4. A device according to claim 1, characterised in that it comprises a recuperator (15) of the condensed gases.

5. A device according to claims 1 to 4, characterised in that it comprises a storing assembly (5, 6, 7) of liquid under pressure comprising a first electrovalve (5) open if the pressure upstream is higher than the pressure downstream, a second electrovalve (6) open when the engine (2) works, and a receiver (7) placed between these two electrovalves and storing the liquid coolant under pressure.

6. A device according to claim 5, characterised in that the evaporator (9) is composed of a lengthened coil (17) whose rectilinear parts are kept spaced between themselves by moveable plaques (18) moving longitudinally along the rectilinear parts of the coil (17) under the pressure of the exhaust gases and ensuring the cleaning of said coil (17).

7. A device according to claim 6, characterised in that it comprises a mixed-matrix cooler of heat (22) placed between the boiler and the exhaust box (10) destined to pre-heat the mixture coolant-absorbent destined to the boiler (1).

8. A depollution procedure of the combustion gases characterised in that it consists in burning said gases in a catalytic chamber (23), cooling said gases to a low temperature to produce the condensation of the substances emitted during the combustion.

9. A procedure according to claim 8, characterised in that it consists in cooling the gases at a temperature situated between 3 and 6° C.

10. A procedure according to claim 9, characterised in that it consists in recovering a liquid resulting from the condensation of the gases.

11. A procedure according to claims 8 to 10, characterised in that it consists in using the thermal energy of the exhaust gases to feed a cooling unit functioning on the base of the absorption by a mixture coolant-absorbent.

* * * * *